(12) United States Patent
Hori

(10) Patent No.: US 7,278,050 B2
(45) Date of Patent: Oct. 2, 2007

(54) STORAGE SYSTEM HAVING REDUNDANCY BLOCK, AND CONTROLLER, CONTROL METHOD, PROGRAM, AND STORAGE MEDIUM FOR STORAGE SYSTEM

(75) Inventor: Shintaroh Hori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 10/825,064

(22) Filed: Apr. 14, 2004

(65) Prior Publication Data

US 2004/0225913 A1    Nov. 11, 2004

(30) Foreign Application Priority Data

Apr. 23, 2003    (JP)    ............... 2003-118907

(51) Int. Cl.
*G06F 11/00*    (2006.01)

(52) U.S. Cl. .............................. 714/6; 714/7

(58) Field of Classification Search ............ 714/6, 714/7

See application file for complete search history.

(56) References Cited

U.S. PATENT DOCUMENTS

| | | | | |
|---|---|---|---|---|
| 6,070,249 | A * | 5/2000 | Lee | 714/6 |
| 6,101,615 | A * | 8/2000 | Lyons | 714/6 |
| 6,397,348 | B1 * | 5/2002 | Styczinski | 714/6 |
| 7,036,953 | B2 * | 5/2006 | Kotovsky | 362/147 |

FOREIGN PATENT DOCUMENTS

| | | |
|---|---|---|
| JP | 6-332632 | 12/1994 |
| JP | 09-034651 | 2/1997 |
| JP | 9-34651 | 2/1997 |

OTHER PUBLICATIONS

Chen et al., "acm computing surveys", Jun. 1994, vol. 26, No. 2, pp. 140-185.*

* cited by examiner

*Primary Examiner*—Michael Maskulinski
(74) *Attorney, Agent, or Firm*—Harrington & Smith, PC

(57) ABSTRACT

In a storage system storing block groups composed of plural storing object blocks in plural storage devices dispersedly, to reduce overheads associated with a block rebuilding process executed if one of the storage devices is defective. The present invention provides a storage system in which one of the storing object blocks is a redundancy block used to rebuild the other storing object blocks, the storage system comprising a block writer storing each of the plural storing object blocks and a copied block copied from any of plural storing object blocks in different storage devices, a block rebuilder operating if a defect is detected in any of the uncopied storing object blocks, to rebuild the defective storing object block based on the plural storing object blocks other than the defective storing object block, and a rebuild block overwriter overwriting the rebuilt storing object block on the copied block or on the storing object block which is an original of the copied block.

25 Claims, 11 Drawing Sheets

[Figure 1]
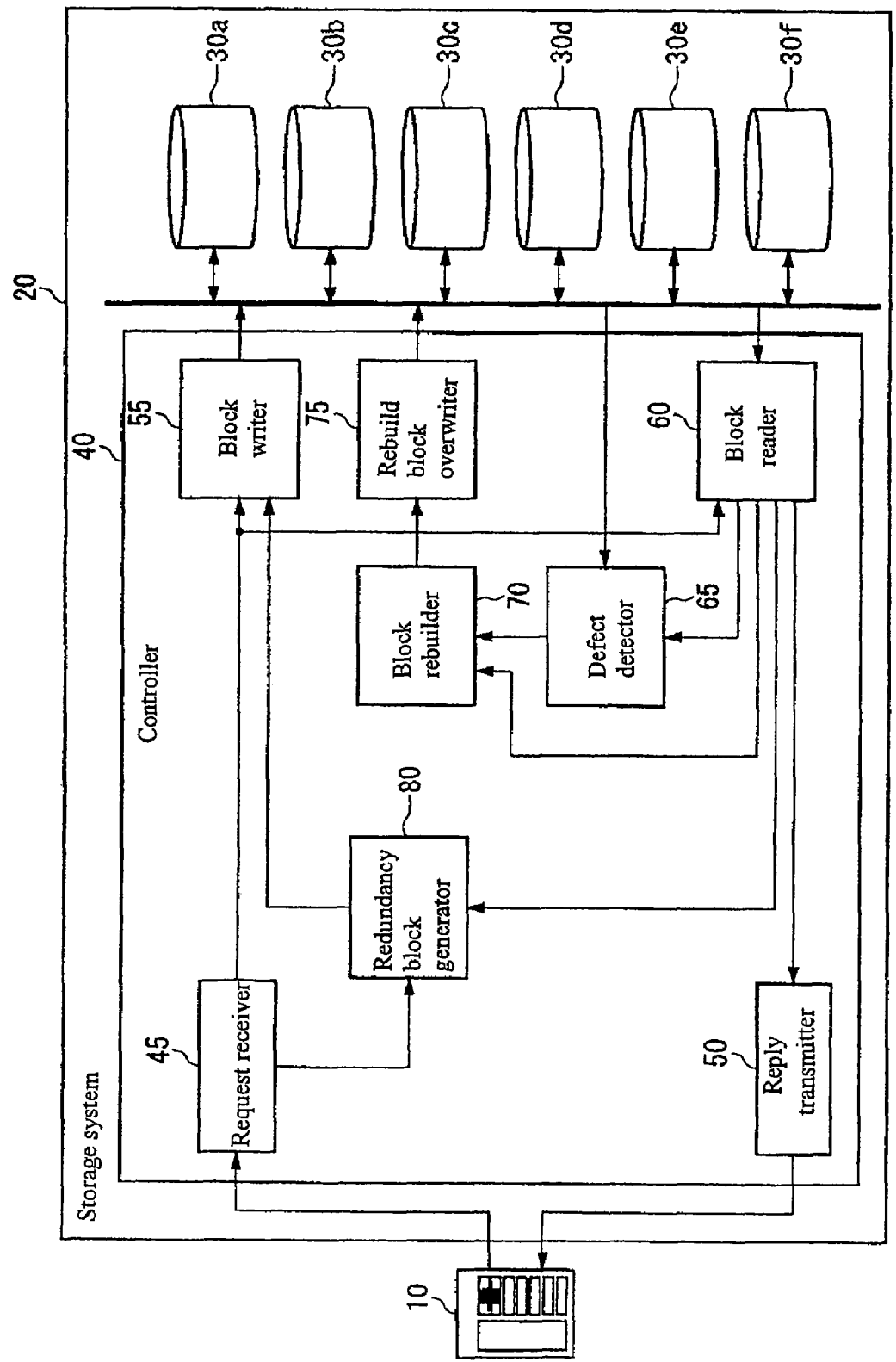

[Figure 2]

| | Storage device 30a | Storage device 30b | Storage device 30c | Storage device 30d | Storage device 30e | Storage device 30f |
|---|---|---|---|---|---|---|
| Stripe 1 | DB1a | DB1b | DB1c | DB1d | PB1 | PB1' |
| Stripe 2 | DB2b | DB2c | DB2d | PB2 | PB2' | DB2a |
| Stripe 3 | DB3c | DB3d | PB3 | PB3' | DB3a | DB3b |
| Stripe 4 | DB4d | PB4 | PB4' | DB4a | DB4b | DB4c |
| Stripe 5 | PB5 | PB5' | DB5a | DB5b | DB5c | DB5d |
| Stripe 6 | PB6' | DB6a | DB6b | DB6c | DB6d | PB6 |

[Figure 3]
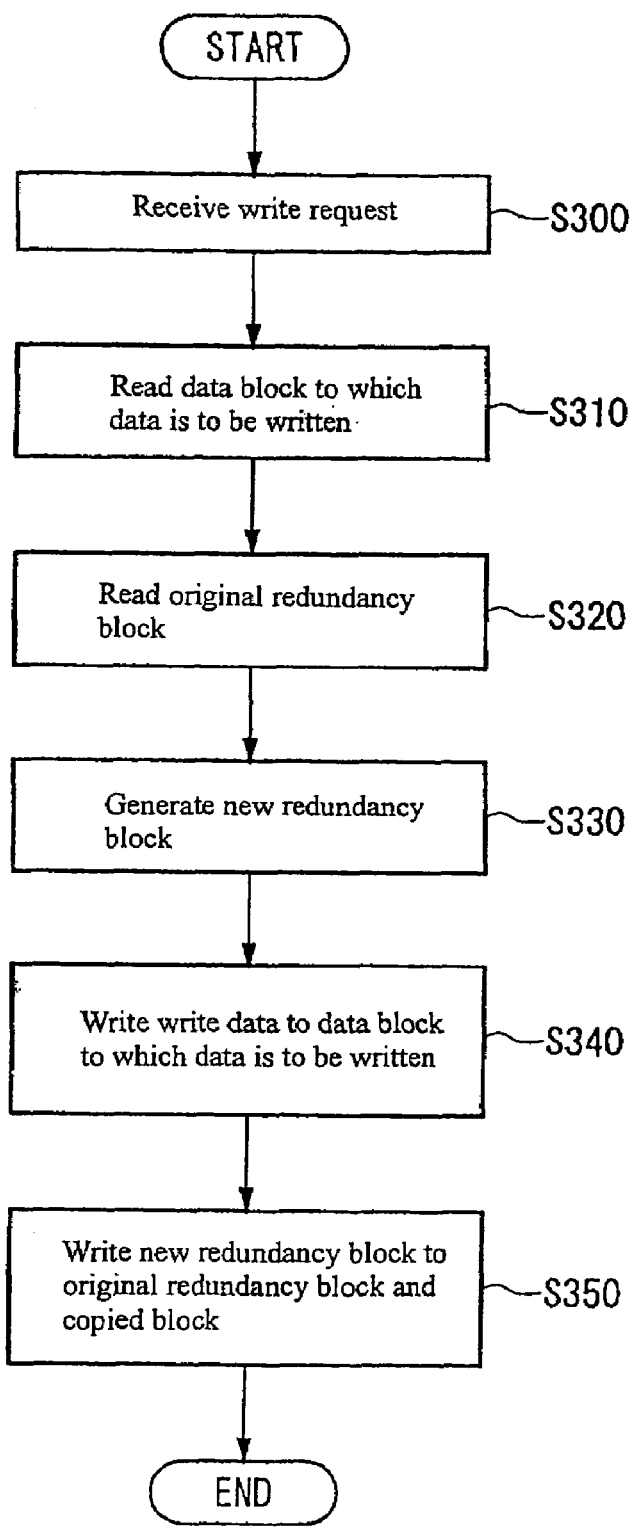

[Figure 4]

|  | Storage device 30a | Storage device 30b | Storage device 30c | Storage device 30d | Storage device 30e | Storage device 30f |
|---|---|---|---|---|---|---|
| Stripe 1 | DB1a | DB1b | DB1c | DB1d | PB1 | PB1' |
| Stripe 2 | DB2b | DB2c | DB2d | PB2 | PB2' | DB2a |
| Stripe 3 | DB3c | DB3d | PB3 | PB3' | DB3a | DB3b |
| Stripe 4 | DB4d | PB4 | PB4' | DB4a | DB4b | DB4c |
| Stripe 5 | PB5 | PB5' | DB5a | DB5b | DB5c | DB5d |
| Stripe 6 | PB6' | DB6a | DB6b | DB6c | DB6d | PB6 |

[Figure 5]
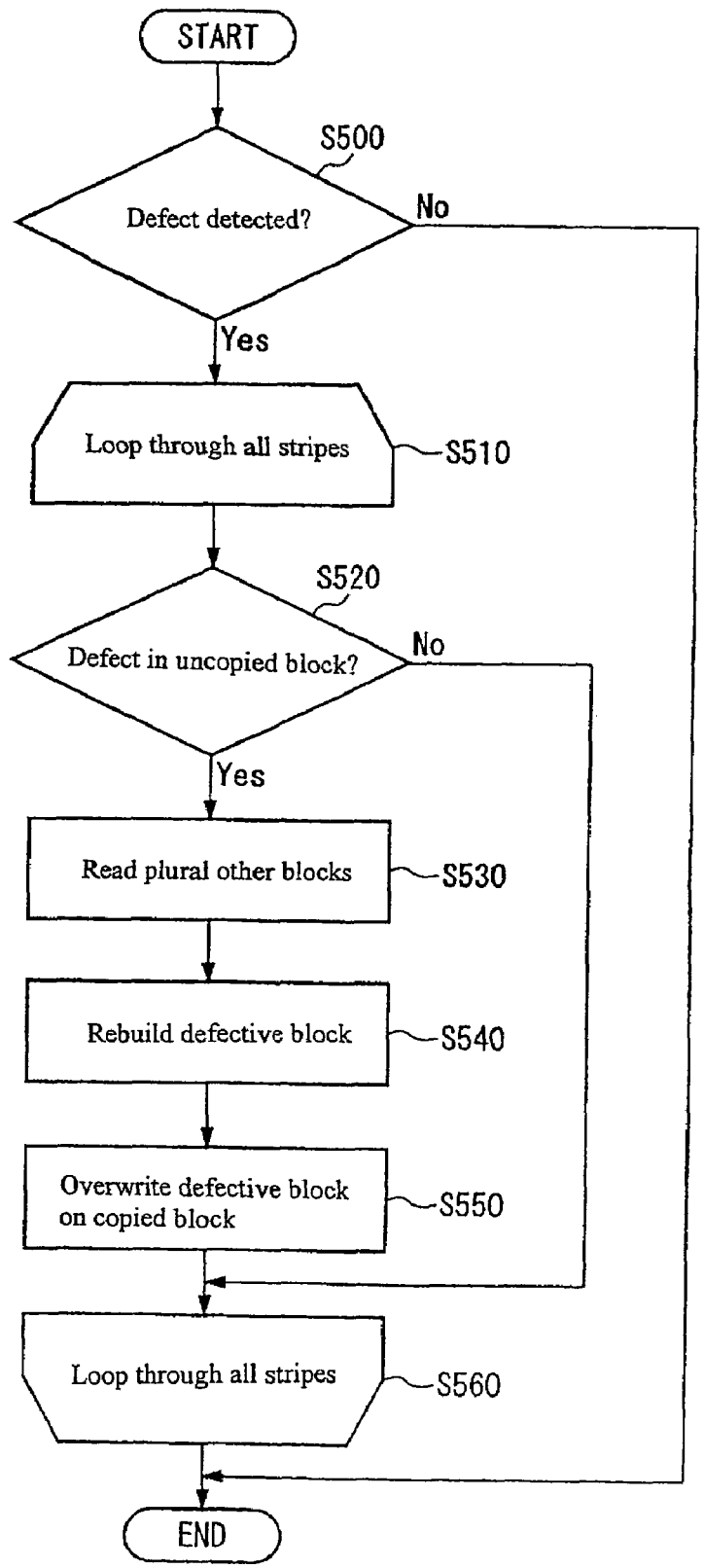

[Figure 6]

|  | Storage device 30a | Storage device 30b | Storage device 30c | Storage device 30d | Storage device 30e | Storage device 30f |
|---|---|---|---|---|---|---|
| Stripe 1 | DB1a | DB1b | DB1c | DB1d | PB1 | (DB1b) |
| Stripe 2 | DB2b | DB2c | DB2d | PB2 | (DB2c) | DB2a |
| Stripe 3 | DB3c | DB3d | PB3 | (DB3d) | DB3a | DB3b |
| Stripe 4 | DB4d | PB4 | PB4' | DB4a | DB4b | DB4c |
| Stripe 5 | PB5 | PB5 | DB5a | DB5b | DB5c | DB5d |
| Stripe 6 | (DB6a) | DB6a | DB6b | DB6c | DB6d | PB6 |

[Figure 7]

|  | Storage device 30a | Storage device 30b | Storage device 30c | Storage device 30d | Storage device 30e | Storage device 30f |
|---|---|---|---|---|---|---|
| Stripe 1 | DB1a | [DB1b] | DB1c | DB1d | PB1 | (DB1b) |
| Stripe 2 | DB2b | [DB2c] | DB2d | PB2 | (DB2c) | DB2a |
| Stripe 3 | DB3c | [DB3d] | PB3 | (DB3d) | DB3a | DB3b |
| Stripe 4 | DB4d | [PB4] | PB4' | DB4a | DB4b | DB4c |
| Stripe 5 | PB5 | [PB5'] | DB5a | DB5b | DB5c | DB5d |
| Stripe 6 | (DB6a) | [DB6a] | DB6b | DB6c | DB6d | PB6 |

[Figure 8]

| | Storage device 30a | Storage device 30b | Storage device 30c | Storage device 30d | Storage device 30e | Storage device 30f |
|---|---|---|---|---|---|---|
| Stripe 1 | DB1a | DB1b | DB1c | DB1d | PB1 | DB1a' |
| Stripe 2 | DB2b | DB2c | DB2d | PB2 | DB2a' | DB2a |
| Stripe 3 | DB3c | DB3d | PB3 | DB3a' | DB3a | DB3b |
| Stripe 4 | DB4d | PB4 | DB4a' | DB4a | DB4b | DB4c |
| Stripe 5 | PB5 | DB5a' | DB5a | DB5b | DB5c | DB5d |
| Stripe 6 | DB6a' | DB6a | DB6b | DB6c | DB6d | PB6 |

[Figure 9]
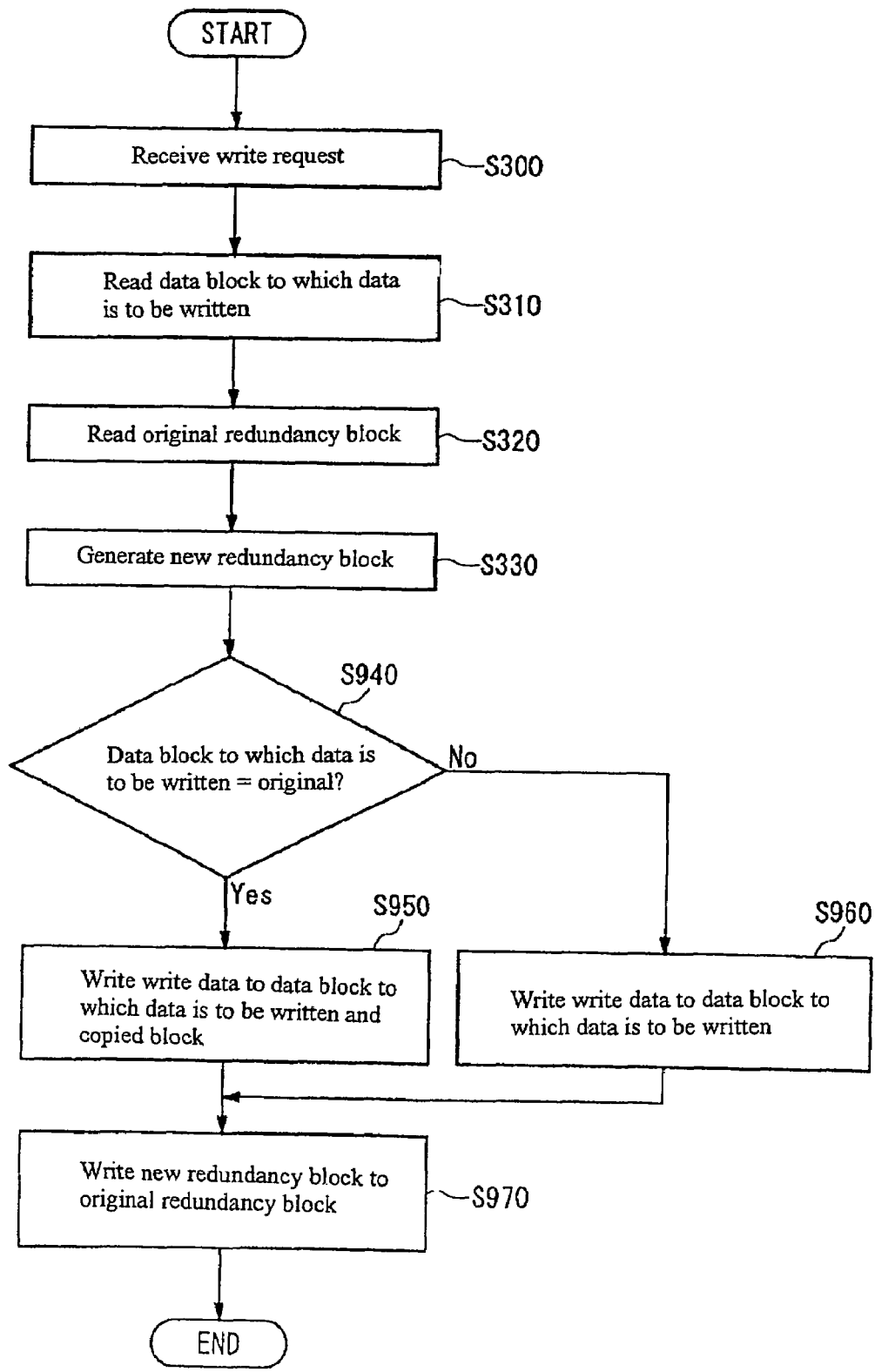

[Figure 10]

|  | Storage device 30a | Storage device 30b | Storage device 30c | Storage device 30d | Storage device 30e | Storage device 30f |
|---|---|---|---|---|---|---|
| Stripe 1 | DB1a | DB1b | DB1c | DB1d | PB1 | (DB1b) |
| Stripe 2 | DB2b | DB2c | DB2d | PB2 | (DB2c) | DB2a |
| Stripe 3 | DB3c | DB3d | PB3 | (DB3d) | DB3a | DB3b |
| Stripe 4 | DB4d | PB4 | (PB4) | DB4a | DB4b | DB4c |
| Stripe 5 | PB5 | DB5a' | DB5a | DB5b | DB5c | DB5d |
| Stripe 6 | DB6a' | DB6a | DB6b | DB6c | DB6d | PB6 |

[Figure 11]
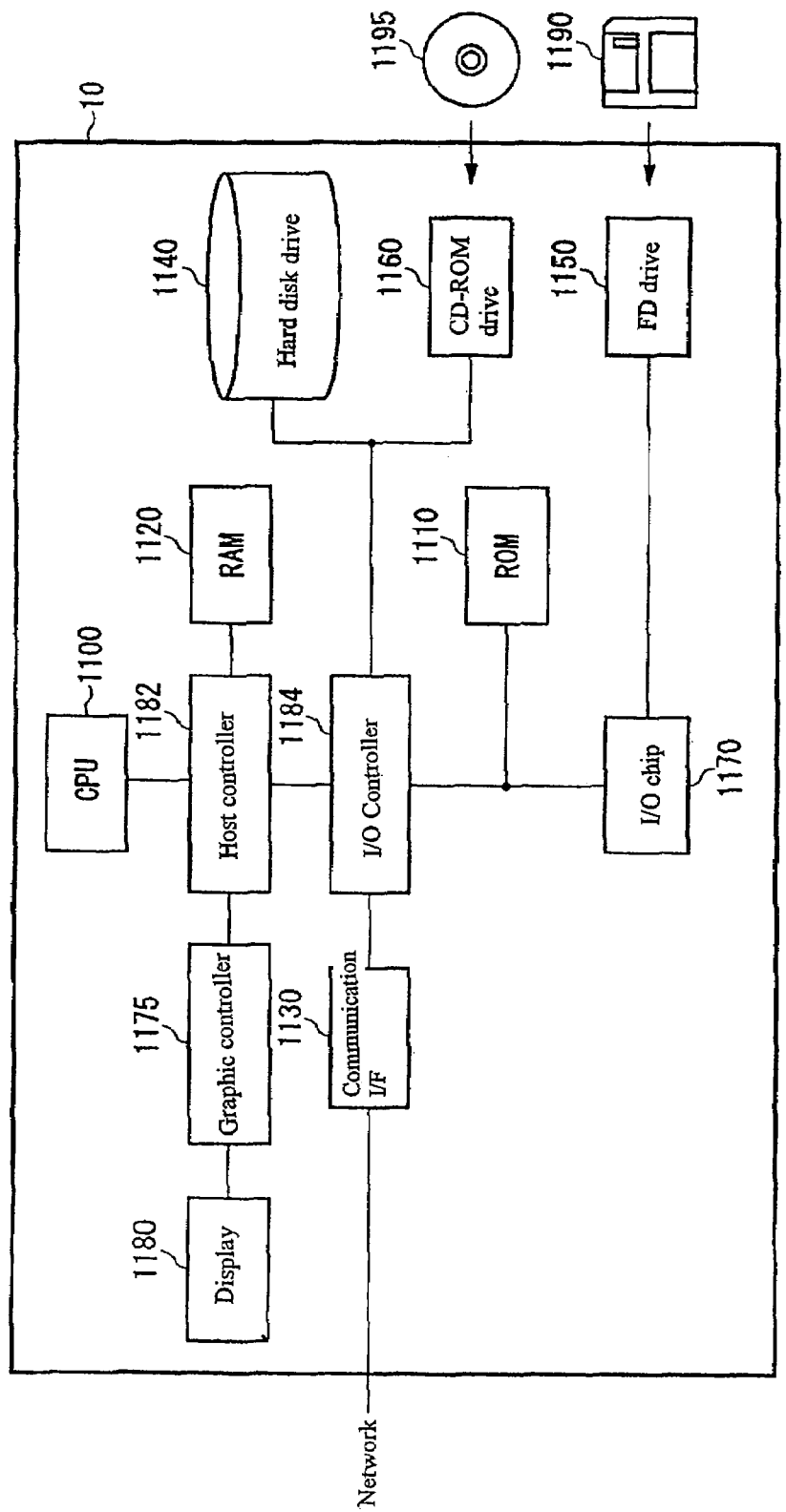

The present invention relates to a storage system having a redundancy block, and a controller, control method, program, and storage medium for this storage system. In particular, the present invention relates to a storage system which stores block groups including plural storing object blocks in plural storage devices dispersedly and which has a redundancy block used if any storing object block in the block groups is defective, to enable this defective storing object block to be rebuilt based on the other storing object blocks, as well as a controller, control method, program, and storage medium for this storage system.

BACKGROUND ART

A RAID technique has hitherto been used to improve the access performance and defect resistance of storage devices such as a hard disk. For example, with a RAID5 configuration, plural storing object blocks composed of plural data blocks and parity blocks are dispersedly stored in plural storage devices in blocks as a block group; the parity blocks are redundancy data used if any of the plural data blocks is defective, to rebuild the defective data block. For example, Patent Document 1 discloses a RAID5 configuration in which parity blocks are dispersedly stored in plural storage devices (Patent Document 1: Published Examined Patent Application No. 5-47857).

A technique has been disclosed which operates if one of plural storage devices is defective, to rebuild corresponding storing object blocks and store them in spare blocks (Patent Document 2: Published Examined Patent Application No. 7-24039). Furthermore, a technique has been disclosed which provides a first and second parity blocks and which updates either the first or second parity block upon a write so that the update of the parity blocks associated with a block write can be distributed to the first and second parity blocks (Patent Document 3: Published Unexamined Patent Application No. 9-34651).

Problems to be Solved by the Invention

If the technique indicated in Patent Document 2 or 3 is used, when one of the storage devices is defective, lost blocks must be rebuilt for all the block groups. The rebuilt blocks must then be written to spare blocks. In this case, a defect in one of the storage devices is critical because information stored in the storage system may be lost if further storage devices become defective. It is thus desirable to reduce overheads associated with the rebuilding of blocks.

SUMMARY OF THE INVENTION

It is an object of the present invention to provide a storage system having a redundancy block, and a controller, control method, program, and storage medium for the storage system, all of which can solve the above problems. This object is accomplished by combining the features described in the independent claims of the present patent. The dependent claims specify further advantageous specific examples of the present invention.

According to a first aspect of the present invention, there are provided a storage system storing block groups including plural storing object blocks in plural storage devices dispersedly, one of the storing object blocks being a redundancy block which is redundancy data used if any of the plural other storing object blocks is defective, to rebuild this storing object block, the storage system comprising plural Storage devices, a block writer storing each of the plural storing object blocks and a copied block copied from any of plural storing object blocks in different storage devices, a block rebuilder operating if a defect is detected in any of the uncopied storing object blocks, to rebuild the defective storing object block based on the plural storing object blocks other than the defective storing object block, and a rebuild block overwriter overwriting the rebuilt storing object block on the copied block or on the storing object block which is an original of the copied block, as well as a controller, control method, program, and storage medium for this storage system.

The above summary of the invention does not refer to all the required features of the present invention. A subcombination of the group of features may also constitute an invention.

BRIEF DESCRIPTION OF THE DRAWINGS

FIG. 1 is a diagram showing the configuration of a storage system 20 according to an embodiment of the present invention;

FIG. 2 is an example of the arrangement of blocks stored in storage devices 30 according to the embodiment of the present invention;

FIG. 3 is a flow chart showing the flow of a write process executed by the storage system 20 according to the embodiment of the present invention;

FIG. 4 is a diagram showing that a storage device 30b is defective in FIG. 2;

FIG. 5 is a diagram showing the flow of a reconstruction process executed by the storage system 20 according to the embodiment of the present invention;

FIG. 6 is a diagram showing an example of a block arrangement obtained after the blocks have been reconstructed in FIG. 4;

FIG. 7 is a diagram showing that the blocks have been rewritten after the replacement of a storage device 30b in FIG. 6;

FIG. 8 is a diagram showing an example of the arrangement of blocks stored in the storage device 30 according to a variation of the embodiment of the present invention;

FIG. 9 is a flow chart showing the flow of a write process executed by the storage system 20 according to the variation of the embodiment of the present invention;

FIG. 10 is a diagram showing an example of a block arrangement obtained after the blocks have been reconstructed as a result of a defect in the storage device 30b in FIG. 8; and FIG. 11 is a diagram showing an example of the hardware configuration of an information processor 10 according to the embodiment of the present invention.

PREFERRED EMBODIMENT

The present invention will be described below with reference to its embodiment. The embodiment described below does not limit the invention according to the claims. Furthermore, all the combinations of the features described in the embodiment are not essential to the solution of the present invention.

FIG. 1 shows the configuration of a storage system 20 according to the present embodiment. The storage system 20 is a redundant disk array system such as a RAID5. In this system, block groups including plural storing object blocks are stored in plural storage devices 30 in blocks. In the storage system 20, in addition to plural storing object blocks, block groups including one or more copied blocks are dispersedly stored in the plural storage devices 30 in blocks, the copied blocks each being copied from a part of the plural storing object blocks.

If one of the storage devices 30 is defective, the copied blocks in the block groups may be used as spare blocks. Since the copied blocks have already been copied from the original storing object blocks when the defect occurs, for block groups in which the original block or copied block is stored in one of the storage devices, the defective blocks need not be rebuilt. It is thus possible to reduce the overheads associated with a data rebuilding process in a critical state.

The storage system 20 is connected to an information processor 10 to read and/or write data in response to a request from the information processor 10. The storage system 20 comprises the plural storage devices 30 and a controller 40.

Each of the storage devices 30 is, for example, a hard disk and stores data in blocks. The plural storage devices 30 dispersedly store block groups including plural storing-object blocks and one or more copied blocks in blocks, the copied blocks each being copied from a part of the plural storing object blocks.

A part of the plural storing object blocks, for example, in the present embodiment, one of the storing object blocks is a redundancy block that is redundancy data used if any of the plural other storing object blocks is defective, to rebuild this storing object block. The plural storing object blocks other than the redundancy block are used to store data used by the information processor 10.

In the example described below in the present embodiment, four data blocks, one redundancy block, and one copied block as a block group are dispersedly stored in the storage devices 30a to 30f in blocks.

The controller 40 controls the plural storage devices 30. The controller 40 has a request receiver 45, a reply transmitter 50, a block writer 55, a block reader 60, a defect detector 65, a block rebuilder 70, a rebuild block overwriter 75, and a redundancy block generator 80.

The request receiver 45 receives a command such as a data block read or write request from the information processor 10. For a write request, the request receiver 45 receives write data together with a write request command. The reply transmitter 50 transmits a reply to the command, to the information processor 10, the reply containing the results of processing and the like. In this case, in response to the read request, the reply transmitter 50 may transmit read data blocks to the information processor 10 as the results of processing.

For each block group, the block writer 55 stores each of the plural storing object blocks and a copied block copied from any of the plural storing object blocks, in the different storage devices 30. If the block reader 60 receives a request from the information processor 10 or if any defective storage device 30 is replaced with a new one 30 and the latter is reconstructed, the block reader 60 reads a block to be read which block is stored in the corresponding storage device 30.

If for example, the block reader 60 cannot read any block stored in the storage device 30 or the read block is defective, the defect detector 65 detects that this block is defective. The defect detector 65 also detects that one of the plural storage devices 30 is defective. In this case, the defect detector 65 detects that all the blocks stored in this storage device 30 are defective.

If the defect detector 65 detects an error in an uncopied storing object block, the block rebuilder 70 reads the plural storing object blocks in the block group including the defective storing object block, via the block reader 60, the plural storing object blocks being other than the defective storing object block. Then, the block rebuilder 70 rebuilds the defective storing object block on the basis of the read blocks. The rebuild block overwriter 75 overwrites the storing object block rebuilt by the defect detector 65 on the copied block in this block group or on the original block that is a storing object block as the original of the copied block.

If the request receiver 45 receives a write request from the information processor 10, the redundancy block generator 80 generates a new redundancy block on the basis of write data, and a data block to which the write data is to be written and the original redundancy block, both blocks having been read via the block reader 60. The new redundancy block generated by the block reader 60 is written to the storage device 30 by the block writer 55.

For each block group, the storage system 20 indicated above stores each of the plural storing object blocks and a copied block copied from any of the plural storing object blocks, in the different storage devices 30. If one of the blocks becomes defective owing to a defect in itself or the corresponding storage device 30, and if the defective block is a copied block or an original block, the block need not be rebuilt. This reduces overheads associated with the rebuilding of the block.

FIG. 2 shows an example of the arrangement of the blocks stored in the storage devices 30 according to the present embodiment. For each of the plural block groups stored in the storage system 20, the block writer 55 stores, in the different storage devices 30, each of the plural storing object blocks included in the block group and a copied block copied from any of the plural storing object blocks. In the present example, for each of the plural block groups, the block writer 55 copies the redundancy block included in the plural storing object blocks of the block group and uses it as a copied block.

For example, a block group shown as a stripe 1 includes four data blocks shown as DB1a, DB1b, DB1c, and DB1d in the figure, a redundancy block shown as PB1 in the figure, and a copied block of the redundancy block shown as PB1' in the figure; the data blocks, the redundancy block, and the copied block are dispersedly stored in the plural storage devices 30. In the present example, the redundancy block PB1 is an original block that is the original of the copied block PB1'. For plural block groups, the block writer 55 interleaves original blocks PB1, PB2, . . . , PB6 and the copied blocks PB1', PB2', . . . , PB6' so that these blocks are dispersedly stored in the plural storage devices 30.

FIG. 3 shows the flow of a write process executed by the storage system 20 according to the present embodiment.

First, the request receiver 45 receives a write request for a write of write data to data blocks that are the plural storing object blocks included in the block group but which are other than the redundancy block (step S300). Upon receiving the write request, the block reader 60 reads the data block to which the write data is to be written and the original redundancy block (steps S310 and S320).

Then, the redundancy block generator 80 generates a new redundancy block based on the write data received by the request receiver 45, and the data block to which the write data is to be written and the original redundancy block, both blocks having been read by the block reader 60 (step S330). More specifically, if the storage system 20 has a RAID5 configuration, the redundancy block generator 80 generates the new redundancy block by executing, for each bit, an exclusive OR on the data block to which the write data is to be written, the original redundancy block, and the write data. Then, the block writer 55 writes the write data to the data block to which the write data is to be written (step S340). It also writes the new redundancy block to the original redundancy block and copied block (step S350).

The above write process allows the controller 40 to keep, for each of the plural block groups, the copied block and the redundancy block that is the original of the copied block, the same. In this case, the block writer 55 writes the new redundancy block to the redundancy block and copied block in parallel to reduce the processing time required to write the new redundancy block to the two storage devices 30.

FIG. 4 shows that the storage device 30b is defective in FIG. 2. If one of the storage devices 30 is defective as shown in FIG. 4, no blocks stored in this storage device 30 can be read. Thus, the defect detector 65 detects that all the blocks stored in this storage device 30 are defective.

In this case, as shown in FIG. 2, the block writer 55 interleaves plural original blocks and copied blocks in storing them. Thus, as the storage device 30b is defective, the data blocks become defective in the stripes 1, 2, 3, and 6. The original block becomes defective in the stripe 4, and the copied block becomes defective in the stripe 5.

FIG. 5 shows the flow of a reconstruction process executed by the storage system 20 according to the present embodiment. In this case, any of the storage devices 30 is defective.

First, the defect detector 65 detects a defect in any of the storage devices 30 (step S500). If the defect is detected, the controller 40 executes a loop process composed of steps S520, S530, S540, and S550 on each of the plural block groups stored in the storage system 20 (steps S510 and S560).

In the block group determined to be reconstructed as a result of the loop process, if an uncopied storing object block is detected to be defective (YES in step S520), the block rebuilder 70 reads the plural storing object blocks other than the defective storing object blocks from the storage devices 30 via the block reader 60. The block reader 70 rebuilds the defective storing object block based on the read blocks (step S540). Then, the rebuild block overwriter 75 overwrites the rebuilt object block on one of the copied object block or the original object block (step S550).

In the above process, if one of the storage devices 30 is defective, then for each block group in which an uncopied storing object block is stored in this storage device 30, the block rebuilder 70 rebuilds the defective storing object blocks based on the plural storing object blocks other than those stored in this storage device 30. Then, for each block group in which an uncopied storing object block is stored in this storage device 30, the rebuild block overwriter 75 can overwrite the rebuilt storing object block on the corresponding copied or original storing object block.

In this case, it is possible to estimate, in the manner described below, overheads associated with the process of reconstructing all the block groups of the storage system 20 if one of the storage devices 30 is defective. With the storage system 20 according to the present embodiment, for each of the block groups in which an uncopied storing object block is stored in the defective storage device 30, the defective storing object block is rebuilt. On the other hand, for the block groups stored in the storage devices 30 in which either the original or copied block is defective, the defective block need not be rebuilt. Consequently, if copied blocks and original blocks are uniformly interleaved in the plural storage devices 30, when the number of storage devices is N and the number of copied blocks per block group is 1, the ratio of the number of block groups on which a rebuilding operation is performed to the total number of block groups is (N−2)/N.

On the other hand, in a storage system according to Patent Document 2 having no copied blocks but spare blocks, defective blocks need not be rebuilt for block groups in which a spare block is stored in the defective storage device 30. Consequently, the ratio of the number of block groups on which a rebuilding operation is performed to the total number of block groups is (N−1)/N.

As described above, in the above example, the storage system 20 according to the present embodiment enables the number of block groups on which a rebuilding operation is performed during a reconstruction process to be reduced to (N−2)/(N−1) compared to the storage system using spare blocks. In this case, the number of I/O commands issued to the plural storage devices 30 to reconstruct the defective storage device 30 is proportional to the number of block groups on which a rebuilding operation is performed. Thus, if the storage system can process the same number of I/O commands per unit time, then in the above example, the storage system 20 according to the present embodiment can increase the performance of the reconstruction process by a factor of (N−1)/(N−2).

FIG. 6 shows an example of a block arrangement obtained after the blocks have been reconstructed in FIG. 4. The blocks enclosed by parentheses in the figure have been rebuilt by reconstruction.

If the storage device 30b is defective, then for each of the stripes 1, 2, 3, and 6, in which an uncopied storing object block is stored in the storage device 30b, the block rebuilder 70 rebuilds the defective storing object blocks based on the plural storing object blocks other than those stored in the storage device 30b. Then, the rebuild block overwriter 75 overwrites the rebuilt storing object block on the copied or original block.

For example, in the stripe 1, the block rebuilder 70 rebuilds the defective data block DB1b based on the data blocks DB1a, DB1c, and DB1d and the copied block PB1. The rebuild block overwriter 75 overwrites the rebuilt data block DB1b on the original block PB1 in the storage device 30e or the copied block PB1' in the storage device 30f. In FIG. 6, the rebuilt data block DB1b has been overwritten on the copied block PB1'.

Reconstructing the blocks allows the controller 40 to store all the storing object blocks in the normal storage devices 30 for each of the plural block groups. In this case, for the block groups in which the original or copied block is stored in the defective storage device 30, the defective block need not be rebuilt. This serves to reduce overheads associated with the data rebuilding process.

FIG. 7 shows an example in which the blocks have been rewritten after the replacement of the storage device 30b in FIG. 6.

When the defective storage device 30 is replaced with a new storage device 30, for each of the plural block groups, the controller 40 allows the block reader 60 to read rebuilt storing object blocks or copied or original blocks lost owing to a defect. The controller 40 then allows the block writer 55 to write these block back to the storage device 30b. The blocks written back by this process are enclosed by brackets in the figure.

Subsequently, for each of those of the plural block groups which have the rebuilt storing object block, the controller 40 allows the block reader 60 to read the redundancy block. The controller 40 then allows the block writer 55 to overwrite the redundancy blocks on the respective rebuilt storing object blocks. Thus, the block arrangement shown in FIG. 2 is recovered.

As indicated above, if the defective storage device 30 is replaced with a new one 30, then for each block group, the controller 40 writes rebuilt storing object blocks or copied or original blocks lost owing to a defect, back to the storage device 30b. In this state, even if another storage device 30 is defective, only the contents of at most one storing object blockare lost in each of the plural block groups. The blocks stored in the defective storage device 30 can be rebuilt based on the blocks stored in the other storage devices 30. Therefore, if the defective storage device 30 is replaced with a new one 30, it is possible to more quickly overcome a critical state.

FIG. 8 shows an example of the arrangement of blocks stored in the storage devices 30 according to a variation of the present embodiment. In the present variation, for each of the plural block groups stored in the storage system 20, the block writer 55 stores, in the different storage devices 30, each of the plural storing object blocks included in the block group and a copied block copied from any of the plural storing object blocks other than the redundancy block.

For example, in the block group shown as a stripe 1, four data blocks shown as DB1a, DB1b, DB1c, and DB1d in the figure, a redundancy block shown as PB1 in the figure, and a copied block of the data block DB1a which is shown as DB1a' in the figure are dispersedly stored in the plural storage devices 30.

FIG. 9 shows the flow of a write process executed by the storage system 20 according to the variation of the present embodiment.

Steps S900, S910, S920, and S930 are similar to steps S300, S310, S320, and S330 shown in FIG. 3, respectively. Their description is thus omitted.

If the data block to which write data is to be written is the original block (Yes in step S940), the block writer 55 writes the write data to each of the original block and copied block (step S950). On the other hand, if the data block to which write data is to be written is not the original block (No in step S940), the block writer 55 writes the write data to this data block (step S960). Then, the block writer 55 writes a new redundancy block to the original redundancy block (step S970).

According to the storage system 20 indicated above, if the data block to which write data is to be written is not the original block, the write data is written to this data block and only the redundancy block is updated. Consequently, the original block and the copied block can be maintained in the same manner. This reduces the number of times the block writer 55 executes writes on the plural storage devices 30 compared to the case in which the redundancy block is the original block.

FIG. 10 shows an example of a block arrangement obtained after the blocks have been reconstructed as a result of a defect in the storage device 30b in FIG. 8. The blocks enclosed by parentheses in the figure have been rebuilt by reconstruction.

In the present variation, if one of the storage devices 30 is defective, then the controller 40 executes the reconstruction process shown in FIG. 5 to rebuild the defective storing object blocks based on those of the plural storing object blocks which are not defective. The controller 40 then overwrites the rebuilt storing object blocks on the corresponding original or copied blocks. If for example, the storage device 30b is defective, then for each of the stripes 1 to 4, in which an uncopied storing object block is stored in the storage device 30b, the rebuild block overwriter 75 rebuilds the uncopied data block or redundancy block as shown in FIG. 10. Then, the rebuild block overwriter 75 overwrites the rebuilt data block or redundancy block on either the original or copied block (in the present example, the copied block).

According to the present variation, if one of the storage devices 30 is defective, the storage system 20 can reconstruct the corresponding blocks in the same manner as that of copying the redundancy block, to establish a state in which all the storing object blocks are stored in the normal storage devices 30. In this case, for the block groups in which the original block or copied block is stored in the defective storage device 30, the defective blocks need not be rebuilt. This reduces overheads associated with the data rebuilding process.

FIG. 11 shows an example of the hardware configuration of the information processor 10 according to the present embodiment. The information processor 10 according to the present embodiment comprises a CPU periphery having a CPU 1100, a RAM 1120, a graphic controller 1175, and a display 1180 all of which are connected together by a host controller 1182; an I/O having a communication interface 1130, a hard disk drive 1140, and a CD-ROM drive 1160 all of which are connected to the host controller 1182 by an I/O controller 1184; and a legacy I/O having a ROM 1110, a flexible disk drive 1150, and an I/O chip 1170 all of which are connected to the I/O controller 1184.

The host controller 1182 connects the RAM 1120 to the CPU 1100 and graphic controller 1175, which access the RAM 1120 at a high transfer rate. The CPU 1100 operates based on programs stored in the ROM 1110 and RAM 1120 to control each section of the system. The graphic controller 1175 acquires image data generated by the CPU 1100 or the like on a frame buffer provided in the RAM 1120. The graphic controller 1175 causes the image data to be displayed on the display 1180. Alternatively, the graphic controller 1175 may contain a frame buffer storing image data generated by the CPU 1100 or the like.

The I/O controller 1184 connects the host controller 1182 to the communication interface 1130, hard disk drive 1140, and CD-ROM drive 1160, all of which are relatively fast I/O devices. The communication interface 1130 communicates with the storage system 20 or another device via a network. The hard disk drive 1140 stores programs and data used by the CPU 1100 in the information processor 10. The CD-ROM drive 1160 reads a program or data from the CD-ROM 1195 to provide it to the storage system 20 via the I/O controller 1184 or communication interface 1130.

The I/O controller 1184 is connected to the ROM 1110 and a relatively slow I/O device such as the flexible disk drive 1150 or I/O chip 1170. The ROM 1110 stores a boot program executed by the information processor 1000 upon activation, a program dependent on the hardware of the information processor 10, and the like. The flexible disk drive 1150 reads a program or data from the flexible disk 1190 and provides it to the storage system 20 via the I/O controller 1184 and communication interface 1130. The I/O chip 1170 connects to the flexible disk 1190 or to various I/O devices via, for example, a parallel port, a serial port, a keyboard port, or a mouse port.

A program provided to the storage system 20 via the RAM 1120 is stored in a storage medium such as the flexible disk 1190, the CD-ROM 1195, or an IC card. Then, a user provides the program to the storage system 20. The program is read from the storage medium and installed in the controller 40 in the storage system 20 via the I/O controller 1184 and communication interface 1130. The program is then executed by the controller 40.

A program installed in and executed by the controller 40 in the storage system 20 allows the controller 40 in the storage system 20 to cause a request receiving module, a reply transmitting module, a block writing module, a block reading module, a defect detecting module, a block rebuilding module, a rebuild block overwriting module, and a redundancy block generating module to function as the request receiver 45, reply transmitter 50, block writer 55, block reader 60, defect detector 65, block rebuilder 70, rebuild block overwriter 75, and redundancy block generator 80.

The programs or modules indicated above may be stored in an external storage medium. Besides the flexible disk 1190 or the CD-ROM 1195, the storage medium may be, for example, an optical recording medium such as a DVD or PD, a photomagnetic recording medium such as an MD, a tape medium, a semiconductor memory such as an IC card. Alternatively, the program may be provided to the storage system 20 via a network using a storage device such as a hard disk or a RAM which is provided in a server system connected to an exclusive communication network or the Internet.

The present invention has been described using the embodiment. However, the technical scope of the present invention is not limited to the scope of the claims. Various changes or improvements may be made to the above embodiment. It is obvious from the claims that the technical scope of the present invention covers embodiments subjected to such changes or improvements.

According to the above described embodiment, there are provided a storage system having a redundancy block, and a controller, control method, program, and storage medium for this storage system as indicated below.

(1) A storage system storing block groups including plural storing object blocks in plural storage devices dispersedly, one of the storing object blocks being a redundancy block which is redundancy data used if any of the plural other storing object blocks is defective, to rebuild this storing object block, the storage system comprising plural storage devices, a block writer storing each of the plural storing object blocks and a copied block copied from any of plural storing object blocks in different storage devices, a block rebuilder operating if a defect is detected in any of the uncopied storing object blocks, to rebuild the defective storing object block based on the plural storing object blocks other than the defective storing object block, and a rebuild block overwriter overwriting the rebuilt storing object block on the copied block or on the storing object block which is an original of the copied block.

(2) The storage system according to (1), wherein for each of the plural block groups, the block writer stores each of the plural storing object blocks included in the block group and the copied blocks in the different storage devices, wherein if one of the storage devices is defective, then for each of the block groups in which an uncopied storing object block is stored in this storage device, the block rebuilder rebuilds the defective storing object block based on the plural storing object blocks other than the storing object blocks stored in this storage device, andwherein for each of the block groups in which an uncopied storing object block is stored in the storage device, the rebuild block overwriter overwrites the rebuilt storing object block on the copied block or the storing object block which is an original of the copied block.

(3) The storage system according to (1), wherein the block writer stores each of the plural storing object blocks and the copied block copied from the redundancy block included in the plural storing object blocks, in the different storage devices.

(4) The storage system according to (3), further comprising a request receiver receiving a write request for a write of write data to data blocks that are the plural storing object blocks other than the redundancy block, and a redundancy block generator generating a new redundancy block based on the data block to which the write data is to be written, the write data, and the original redundancy block, and wherein the block writer writes the write data to the data block to which the write data is to be written and writes the new redundancy block to the original redundancy block and the copied block.

(5) The storage system according to (1), wherein the block writer stores each of the plural storing object blocks and the copied block copied from any of plural data blocks that are the plural storing object blocks other than the redundancy block, in the different storage devices.

(6) The storage system according to (5), further comprising a request receiver receiving a write request for a write of write data to data blocks that are the plural storing object blocks other than the redundancy block, and wherein if the data block to which the write data is to be written is the original block, the block writer writes the write data to each of the original block and the copied block, and if the data block to which the write data is to be written is not the original block, the block writer writes the write data to the data block to which the write data is to be written.

(7) A controller for a storage system storing block groups including plural storing object blocks in plural storage devices dispersedly, one of the storing object blocks being a redundancy block which is redundancy data used if any of the plural other storing object blocks is defective, to rebuild this storing object block, the controller comprising a block writer storing each of the plural storing object blocks and a copied block copied from any of plural storing object blocks in different storage devices, a block rebuilder operating if a defect is detected in any of the uncopied storing object blocks, to rebuild the defective storing object block based on the plural storing object blocks other than the defective storing object block, and a rebuild block overwriter overwriting the rebuilt storing object block on the copied block or on the storing object block which is an original of the copied block.

(8) A method for controlling a storage system storing block groups including plural storing object blocks in plural storage devices dispersedly, one of the storing object blocks being a redundancy block which is redundancy data used if any of the plural other storing object blocks is defective, to rebuild this storing object block, the method comprising the steps of a block writing step of storing each of the plural storing object blocks and a copied block copied from any of plural storing object blocks in different storage devices, a block rebuilding step of operating if a defect is detected in any of the uncopied storing object blocks, to rebuild the defective storing object block based on the plural storing object blocks other than the defective storing object block, and a rebuild block overwriting step of overwriting the rebuilt storing object block on the copied block or on the storing object block which is an original of the copied block.

(9) A program for controlling a storage system storing block groups including plural storing object blocks in plural storage devices dispersedly, one of the storing object blocks being a redundancy block which is redundancy data used if any of the plural other storing object blocks is defective, to rebuild this storing object block, the program allowing the storage system to function as a block writer storing each of the plural storing object blocks and a copied block copied from any of plural storing object blocks in different storage devices, a block rebuilder operating if a defect is detected in any of the uncopied storing object blocks, to rebuild the defective storing object block based on the plural storing object blocks other than the defective storing object block; and a rebuild block overwriter overwriting the rebuilt storing object block on the copied block or on the storing object block which is an original of the copied block.

(10) A storage medium in which the program according to (9) is stored.

ADVANTAGES OF THE INVENTION

As is clear from the above description, according to the present invention, in a storage system storing block groups composed of plural storing object blocks in plural storage devices dispersedly, it is possible to reduce overheads associated with a block rebuilding process executed if one of the storage devices is defective.

DESCRIPTION OF SYMBOLS

10 . . . Information processor
20 . . . Storage system
30a to 30f . . . Storage devices
40 . . . Controller
45 . . . Request receiver
50 . . . Reply transmitter
55 . . . Block writer
60 . . . Block reader
65 . . . Defect detector
70 . . . Block rebuilder
75 . . . Rebuild block overwriter
80 . . . Redundancy block generator
1100 . . . CPU
1110 . . . ROM
1120 . . . RAM
1130 . . . Communication interface
1140 . . . Hard disk drive
1150 . . . Flexible disk drive
1160 . . . CD-ROM drive
1170 . . . I/O chip
1175 . . . Graphic controller
1180 . . . Display
1182 . . . Host controller
1184 . . . I/0 controller
1190 . . . Flexible disk
1195 . . . CD-ROM

What is claimed is:

1. A storage system that stores block groups including a plurality of object blocks in a plurality of storage devices, one of said object blocks being a redundancy block comprising redundancy data used if one of the plurality of object blocks is defective, the storage system comprising:
a plurality of storage devices;
a block writer that stores in different ones of the plurality of storage devices object blocks and a copied object block;
a block rebuilder responsive to a defect being detected in an uncopied one of said object blocks, to rebuild a corresponding defective object block based on stored ones of the object blocks other than said defective object block; and
a rebuild block overwriter that overwrites a rebuilt object block on one of the copied object block or an original object block that is an original of the copied object block, wherein said block writer stores in said different storage devices each of said plurality of object blocks and said copied block that is copied from any one of plural data blocks corresponding to said plurality of object blocks other than said redundancy block.

2. The storage system according to claim 1, wherein for each of said block groups, said block writer stores in said different storage devices each of said plurality of object blocks included in the block group and said copied block, wherein if one of said storage devices is defective, then for each of said block groups in which an uncopied object block is stored in said defective storage device, said block rebuilder rebuilds said defective object block based on object blocks other than the object block stored in said defective storage device, and wherein for each of said block groups in which an uncopied object block is stored in said defective storage device, said rebuild block overwriter overwrites said rebuilt object block on the one of said copied object block or said original object block.

3. The storage system according to claim 1, wherein said block writer stores each of said plurality of object blocks and a copied object block that is copied from said redundancy block in said different storage devices.

4. The storage system according to claim 3, further comprising:
a request receiver to receive a write request for a write of write data to a plurality of data blocks that are said plurality of object blocks other than said redundancy block; and
a redundancy block generator to generate a new redundancy block based on said plurality of data blocks to which the write data is to be written, on said write data, and on an original redundancy block, and wherein said block writer writes said write data to said plurality of data blocks to which the write data is to be written and writes said new redundancy block to said original redundancy block and to said copied block.

5. The storage system according to claim 1, further comprising: a request receiver to receive a write request for a write of write data to a plurality of data blocks that are said plurality of object blocks other than said redundancy block; and wherein if said data block to which the write data is to be written is said original object block, said block writer writes said write data to each of said original object blocks and to said copied block, and if said data block to which the write data is to be written is not said original object block, said block writer writes said write data to said data block to which the write data is to be written.

6. A controller for a storage system storing block groups including plural object blocks in plural storage devices, one of said object blocks being a redundancy block comprising redundancy data used if one of the plural other object blocks is defective, the controller comprising: a block writer that stores in different ones of the plural storage devices object blocks and a copied object block; a block rebuilder responsive to a defect being detected in an uncopied one of said object blocks, to rebuild a corresponding defective object block based on stored ones of the object blocks other than said defective object block; and a rebuild block overwriter that overwrites a rebuilt object block on one of the copied object block or an original object block that is an original of the copied object block, wherein said block writer stores in said different ones of the plural storage devices each of said plurality of object blocks and said copied block that is copied from any one of plural data blocks corresponding to said plurality of object blocks other than said redundancy block.

7. A method to control a storage system to store in plural storage devices block groups that comprise plural object blocks, one of said object blocks being a redundancy block comprising redundancy data used if one of the plurality of object blocks is defective, the method comprising:

storing in different storage devices each of the plural object blocks and a copied block that is copied from any of one of the plural object blocks;

responsive to detecting a defect in an uncopied object block, rebuilding the defective object block based on a plurality of object blocks other than said defective object block; and overwriting the rebuilt object block on the one of the copied block or the original object block of the copied object block, wherein each of said plurality of object blocks and said copied block that is copied from any one of plural data blocks corresponding to said plurality of object blocks other than said redundancy block is stored in different ones of the plural storage devices.

8. A computer program stored on a computer readable medium that executes on a computer to control a storage system that stores in a plurality of storage devices block groups comprising plural object blocks, one of said object blocks being a redundancy block comprising redundancy data used if one of the plurality of object blocks is defective, the computer program comprising computer executable program instructions comprised of:

first computer executable program instructions to implement a block writer that stores in different ones of the plurality of storage devices object blocks and a copied object block;

second computer executable program instructions to implement a block rebuilder that is responsive to a defect being detected in an uncopied one of said object blocks, to rebuild a corresponding defective object block based on stored ones of the object blocks other than said defective object block; and third computer executable program instructions to implement a rebuild block overwriter that overwrites a rebuilt object block on one of the copied object block or an original object block that is an original of the copied object block, wherein said first computer executable program instructions stores in said different storage devices each of said plurality of object blocks and said copied block that is copied from any one of plural data blocks corresponding to said plurality of object blocks other than said redundancy block.

9. The computer program stored on a computer readable medium that executes on a computer according to claim 8, wherein for each of said block groups, said first computer executable program instructions stores in said different storage devices each of said plurality of object blocks included in the block group and said copied block, wherein if one of said storage devices is defective, then for each of said block groups in which an uncopied object block is stored in said defective storage device, said second computer executable program instructions rebuilds said defective object block based on object blocks other than the object block stored in said defective storage device, and wherein for each of said block groups in which an uncopied object block is stored in said defective storage device, said third computer executable program instructions overwrites said rebuilt object block on the one of said copied object block or said original object block.

10. The computer program stored on a computer readable medium that executes on a computer according to claim 8, further comprising: fourth computer executable program instructions to implement a request receiver to receive a write request for a write of write data to a plurality of data blocks corresponding to a plurality of object blocks other than said redundancy block; and fifth computer executable program instructions to implement a redundancy block generator to generate a new redundancy block based on said plurality of data blocks to which the write data is to be written, on said write data, and based on an original redundancy block, and wherein said first computer executable program instructions writes said write data to said plurality of data blocks to which the write data is to be written and writes said new redundancy block to said original redundancy block and to said copied block.

11. The computer program stored on a computer readable medium that executes on a computer according to claim 8, further comprising: fourth computer executable program instructions to implement a request receiver to receive a write request for a write of write data to a plurality of data blocks corresponding to a plurality of object blocks other than said redundancy block; and wherein if said data block to which the write data is to be written is said original object block, said first computer executable program instructions writes said write data to each of said original object blocks and to said copied block, and if said data block to which the write data is to be written is not said original object block, said first computer executable program instructions writes said write data to said data block to which the write data is to be written.

12. A controller for a data storage system, said controller comprising a first interface for coupling to an information processor and a second interface for coupling to a plurality of data storage devices, said controller being responsive to read and write requests received through said first interface for reading data from, and for writing data to, respectively, said plurality of data storage devices through said second interface, said controller further comprising a request receiver and a reply transmitter for coupling to said information processor through said first interface, said controller further comprising a redundancy block generator, a block rebuilder, a data storage device defect detector, a block writer, a block reader and a rebuild block overwriter all of which are coupled to said plurality of data storage devices through said second interface and that cooperate to store block groups in a dispersed fashion in plural ones of said data storage devices, where each of said block groups is comprised of object blocks comprised of plural data blocks and at least one redundancy block for use by said block rebuilder for error recovery purposes in response to said defect detector detecting a defect, where said block writer operates to store, in different ones of said storage devices, each of the object blocks as a plurality of uncopied blocks and as a copied block that is a copy of one of said object blocks; where said block rebuilder operates, in response to said defect detector detecting a defect in a storage device that stores one of said uncopied blocks, to rebuild the corresponding defective block as a rebuilt block; and said rebuild block overwriter operates to overwrite the rebuilt block into the copied block unless the copied block corresponds to the defective block, where said copied block is a copy of one of said data blocks.

13. A controller as in claim 12, where said copied block is a copy of said redundancy block.

14. In a data storage system comprised of N storage devices, a method comprising:
storing data in stripes across the N storage devices by storing in an interleaved manner N−2 data blocks, one redundancy block for error recovery purposes, and one copied block; and upon detecting a defective storage device, rebuilding (N−2)/N of the stripes such that, for a given one of the stripes, the stripe is rebuilt if the block that is stored on the defective storage device is other than a copied block or an original block from which the copied block was made.

15. A method as in claim 14, where said copied block in each stripe is a copy of one of said data blocks.

16. A method as in claim 14, where said copied block in each stripe is a copy of said redundancy block.

17. A storage controller for use in a RAID data storage system comprised of N storage devices, said storage controller operating under the control of a program comprised of computer instructions that direct said storage controller to store data in stripes across the N storage devices by storing in an interleaved manner N−2 data blocks, one redundancy block for error recovery purposes, and one copied block, said computer instructions further directing said storage controller, upon detecting an occurrence of a defective storage device, to rebuild (N−2)/N of the stripes such that, for a given one of the stripes, the stripe is rebuilt if the block that is stored on the defective storage device is other than a copied block or an original block from which the copied block was made.

18. A storage controller as in claim 17, where said copied block in each stripe is a copy of one of said data blocks.

19. A storage controller as in claim 17, where said copied block in each stripe is a copy of said redundancy block.

20. A plurality N of data storage devices coupled to a storage controller in a data storage system, said N data storage devices having data stored in stripes across the N data storage devices in an interleaved manner, each stripe comprising N−2 data blocks, one redundancy block for error recovery purposes, and one copied block, and upon an occurrence of a defect in one of said N data storage devices, the N data storage devices storing rebuilt data in (N−2)/N of the stripes such that, for a given one of the stripes, the stripe stores rebuilt data if the block that is stored on the defective one of the N data storage devices is other than a copied block or an original block from which the copied block was made.

21. A plurality N of data storage devices as in claim 20, where said copied block in each stripe is a copy of one of said data blocks.

22. A plurality N of data storage devices as in claim 20, where said copied block in each stripe is a copy of said redundancy block.

23. A storage controller for use in a data storage system comprised of N storage devices, said storage controller comprising a first interface for coupling to an information processor and a second interface for coupling to the N storage devices, said storage controller further comprising data storage means for storing data in stripes across the N storage devices by storing in an interleaved manner N−2 data blocks, one redundancy block for error recovery purposes, and one copied block, said storage controller further comprising rebuilder means, responsive to detecting an occurrence of a defective one of said N storage devices, for rebuilding (N−2)/N of the stripes such that, for a given one of the stripes, the stripe is rebuilt if the block that is stored on the defective storage device is other than a copied block or an original block from which the copied block was made.

24. A storage controller as in claim 23, where said copied block in each stripe is a copy of one of said data blocks.

25. A storage controller as in claim 23, where said copied block in each stripe is a copy of said redundancy block.

* * * * *